(12) United States Patent
Ayyagari et al.

(10) Patent No.: US 10,477,118 B2
(45) Date of Patent: Nov. 12, 2019

(54) SYSTEM AND METHODS FOR DEPTH IMAGING USING CONVENTIONAL CCD IMAGE SENSORS

(71) Applicant: Texas Instruments Incorporated, Dallas, TX (US)

(72) Inventors: Ravishankar S. Ayyagari, Bangalore (IN); Bharath Patil, Banglore (IN); Shantanu Prasad Prabhudesai, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/174,120

(22) Filed: Oct. 29, 2018

(65) Prior Publication Data

US 2019/0075257 A1 Mar. 7, 2019

Related U.S. Application Data

(62) Division of application No. 14/472,060, filed on Aug. 28, 2014, now Pat. No. 10,116,883.

(30) Foreign Application Priority Data

Aug. 29, 2013 (IN) .......................... 3871/CHE/2013

(51) Int. Cl.
*H04N 5/33* (2006.01)
*H04N 5/372* (2011.01)
(Continued)

(52) U.S. Cl.
CPC ............. *H04N 5/33* (2013.01); *G01S 7/4816* (2013.01); *G01S 7/4914* (2013.01);
(Continued)

(58) Field of Classification Search
CPC ........ G01S 17/36; G01S 17/89; G01S 7/4816; G01S 7/4914; G01S 7/4915; H04N 13/0271; H04N 5/33; H04N 5/372
(Continued)

(56) References Cited

U.S. PATENT DOCUMENTS 7,248,344 B2 * 7/2007 Morcom ................. G01S 7/487
356/10
7,796,174 B1 * 9/2010 Harwit .............. H01L 27/14806
250/208.1

(Continued)

OTHER PUBLICATIONS

"pmd technology—Unique Features", pp. 1-4, pmd technology, website pages retrieved from the world wide web url address: http://www.pmdtec.com/technology/unique_features.php on Aug. 28, 2014.

(Continued)

*Primary Examiner* — Mohammed S Rahaman
(74) *Attorney, Agent, or Firm* — John R. Pessetto; Charles A. Brill; Frank D. Cimino

(57) ABSTRACT

Systems and methods for providing depth imaging using a CCD image sensor. In a method for visual imaging and depth imaging, steps include providing a CCD image sensor device arranged to receive light from an optical lens and having an array of pixels and corresponding pixel charge storage elements; providing a light source for transmitting light pulses responsive to a pulse control signal; providing timing signals to configure the CCD image sensor to collect and store charge from the pixel storage elements; and performing a depth calculation using a background charge, a reflected charge, and a depth charge collected in three frame periods for each pixel in the CCD image sensor. A system including a CCD image sensor for use with the embodiments is disclosed. Additional embodiments are disclosed.

5 Claims, 8 Drawing Sheets

(51) Int. Cl.
- *G01S 17/36* (2006.01)
- *G01S 17/89* (2006.01)
- *G01S 7/481* (2006.01)
- *G01S 7/491* (2006.01)
- *H04N 13/128* (2018.01)
- *H04N 13/271* (2018.01)

(52) U.S. Cl.
CPC ............ *G01S 7/4915* (2013.01); *G01S 17/36* (2013.01); *G01S 17/89* (2013.01); *H04N 5/372* (2013.01); *H04N 13/128* (2018.05); *H04N 13/271* (2018.05)

(58) Field of Classification Search
USPC .......................................................... 348/138
See application file for complete search history.

(56) References Cited

U.S. PATENT DOCUMENTS

| | | | | |
|---|---|---|---|---|
| 8,125,367 | B2* | 2/2012 | Ludwig | G01S 17/89 341/122 |
| 8,902,411 | B2* | 12/2014 | Park | G01S 17/89 356/5.1 |
| 9,000,349 | B1* | 4/2015 | Lehmann | H01L 27/14616 250/214.1 |
| 9,076,709 | B2* | 7/2015 | Felber | H01L 27/14812 |
| 2005/0029430 | A1* | 2/2005 | Atmur | H04N 5/2353 250/201.1 |
| 2009/0169195 | A1* | 7/2009 | Chen | H04N 5/2353 396/246 |
| 2011/0141306 | A1* | 6/2011 | Nakano | G06K 9/3241 348/222.1 |
| 2012/0281206 | A1* | 11/2012 | Ko | G01S 17/89 356/218 |
| 2013/0211657 | A1* | 8/2013 | Zeng | G01S 17/58 701/28 |
| 2015/0057167 | A1* | 2/2015 | Kaiser | H04N 5/372 506/9 |

OTHER PUBLICATIONS

"DepthSense Sensors", pp. 1-2, SoftKinetic, website pages retrieved from the world wide web url address: http://www.softkinetic.com/products/depthsensesensors.aspx on Aug. 28, 2014.

"Product Overview, Standard TOF Cameras", pp. 1-3, Mesa Imaging, website pages retrieved from the world wide web url address: http://www.mesa-imaging.ch/products/product-overview/ on Aug. 28, 2014.

* cited by examiner

ID="1" />
SYSTEM AND METHODS FOR DEPTH IMAGING USING CONVENTIONAL CCD IMAGE SENSORS

RELATED APPLICATIONS

This patent application is a divisional of U.S. Nonprovisional patent application Ser. No. 14/472,060, which claims priority to India Provisional Patent Application No. 3871/CHE/2013, entitled "Depth Imaging Using Conventional CCD Image Sensors," filed Aug. 29, 2013, which are hereby incorporated in their entirety herein by reference.

TECHNICAL FIELD

The embodiments relate generally to depth imaging using image sensors. More particularly the embodiments provide systems and methods for depth imaging using conventional CCD image sensors that are commercially available for use in digital cameras, cellphones, camcorders and the like, with no special hardware required. Applications of depth imaging include, without limitation, interactive gaming platforms, security and motion related imaging, depth measurements and metering, and three dimensional imaging such as three dimensional photography and video applications. The embodiments advantageously provide depth image information along with high quality two dimensional images, using commercially available CCD image sensors and processors, and without the need for specialized processes, circuits or additional hardware. Use of the embodiments advantageously provides a low cost, high performance depth imaging solution that is easily produced.

BACKGROUND

Recent improvements in imaging include the use of depth information for producing three dimensional images. In consumer applications, and in particular in gaming systems, depth image sensing has become increasingly used in commercial products following the recent introduction of game systems that sense player motion, such as the Kinect system, from Microsoft. In these systems, players can use motion of their hands, heads, or bodies to interact with the system and cause the image displayed on their television by the game to change, instead of using only a handheld controller. Gestures may be used to control the system instead of keystrokes or controller buttons. 3D depth sensing enables natural user interaction with machines using hand and body gestures, instead of keyboard entry or buttons for example. Many other applications are emerging such as hand or body control of computers and other portable devices, intelligent machine vision applications, and surveillance and analytics.

Depth imaging involves imaging a scene in front of an imager (a camera or image sensing system) in three dimensions: x, y and z. The depth image sensor can detect movement for gesture control and other three dimensional (3D) machine vision applications.

In the known prior solutions, depth imaging requires highly specialized technology. A dedicated imaging sensor that was produced using advanced semiconductor processes, a specialized illumination system, and/or specialized information processing systems have been required.

In the approaches known to date, stereo-vision, structured light, or a dedicated Time of Flight ("TOF") sensing schemes were used to determine the depth information. Stereo vision systems require two sensors, spaced apart, and also require very intensive post processing of the images to extract the 3D information. Structured light systems require a specialized diffraction emitter and further, a dedicated post processing processor (yet another specialized integrated circuit or chip).

TOF sensing uses the time delay involved in the transit of light from an illumination source, or emitter, to the objects in a scene and back to the sensor pixels. The transit time is measured as a phase shift. The phase shift can be used to calculate the distance, i.e., depth. In the known prior systems, the TOF measurements use a dedicated image sensor optimized for the depth image. This dedicated sensor is produced in a modified semiconductor process technology, for example a specialized modification of a CMOS pixel structure. The dedicated sensor is used to demodulate the incoming light and thus measure the phase shift of the incoming light pulse (relative to the outgoing light source). The known methods require significant and costly additional hardware, either in using the dedicated and specialized depth image sensors, or in significant post processing solutions, that are far more complex and costly than the hardware and processors needed to produce a conventional two dimensional imaging system, such as a digital camera. Further in applications that require both depth image sensing for 3D and a visual or display image, such as for example a two dimensional ("2D") color image; multiple sensors are needed for producing the two kinds of images. This is the case for conventional 3D gesture control applications, such as gaming consoles, which are currently known.

FIG. 1 depicts, in an example system diagram, an illustration of the TOF measurements as performed using known prior approaches. In FIG. 1, a system 10 is shown including a controlled infrared illumination source 13 that is coupled to a sensor 15. Optic lens 17 collects light and focuses the collected light onto the sensor 15. A person 11 is shown standing in front of the sensor and the illumination 15.

In performing depth imaging, a time of flight (TOF) measurement may be used. The controlled illumination 15, which may be one or an array of infrared ("IR") LED elements, for example, is turned on. The time that the IR illumination takes to leave the illumination system, reach the objects in the scene, and return as reflected light to the sensor 13 is the 'time of flight'. Using the speed of light, one can see that this time of flight correlates to the time the light takes to travel twice the distance that the person 11 in the scene is from the sensor 13. That distance is the depth of the object from the sensor (depth into the scene).

In conventional approaches, TOF measurements are made by direct measurement. In this approach the time is measured using a digital or analog time keeper. Alternatively, the TOF measurement can be made indirectly, by obtaining the phase difference between the emitted light (from the illumination source) and the received modulated light (reflected from the objects in the scene). In most conventional systems the phase difference approach is used. The phase difference approach is particularly popular for depth image applications which use relatively short distances, such as 1 meter to 20 meters.

In order to optimize the depth imaging, several specialized pixel structures have been fabricated. Known approaches are illustrated, for example, by systems made and sold by PMD Tech, described at the world wide web url address: http://www.pmdtec.com/technology/unique_features.php/. PMD Tech apparently offers a dedicated integrated circuit produced in a CMOS process that is optimized for depth imaging. Another similar solution is offered by Softkinetic, described at the world wide web url address: http://www.softkinetic.com/products/depthsensesensors.aspx. Another known approach is offered by Mesa Imaging, described at the world wide web url address: http://www.mesa-imaging.ch/products/product-overview/.

The prior known approaches require the use of a modified CMOS semiconductor process to build a dedicated depth imaging sensor. While the TOF measurements are available from using such a specialized sensor, in a typical application for depth imaging, an image for visual imaging of reasonably high quality is also desired. In order to provide both the depth imaging features and a visual display image such as a 2D color image, the prior known approaches also require, in addition to the costly sensor solutions for the depth imaging, a second image sensor that includes another imaging sensor for a visual image, and optics to use with that sensor. Thus in order to meet the needs of a typical application, the known prior system requires two complete image sensors (and the associated hardware and software) to form the desired 3D image.

Improvements in the methods used to produce depth images for 3D applications, as well as images for visual display, are therefore needed. Solutions for depth and visual imaging are needed that do not require additional proprietary and expensive depth image sensors, and which are cost effective, simple to implement, robust and ready to market.

SUMMARY

The embodiments provide both imaging for visual display, such as 2D color imaging, and depth imaging using a single conventional CCD image sensor with existing hardware. By using conventional CCD image sensors in conjunction with the use of existing analog processing and digital processing integrated circuits, costs to implement the solutions incorporating the embodiments are minimal. Because the embodiments utilize existing CCD image sensors such as those that are already in use in cameras and camcorders, for example, use of the embodiments easily enable adding depth imaging features to existing systems. The novel method embodiments may be used by making software changes only, without the need for expensive hardware modifications.

In an embodiment, a method for depth imaging using a CCD image sensor includes providing an optical lens for collecting light from a scene having objects in front of the lens; providing a CCD image sensor device arranged to receive light from the optical lens and having an array of pixels and corresponding pixel charge storage elements; providing a light source for transmitting light pulses towards the scene responsive to a pulse control signal; providing timing signals to configure the CCD image sensor to collect and store charge from pixels including a VSUB control signal that clears the pixel charge storage elements; and, in a background frame period, collecting a background charge corresponding to light incident on the CCD sensor that is reflected ambient light from objects in front of the lens; in a reflected light frame period, outputting a pulse from the light source, and collecting a reflected charge corresponding to light that is reflected from objects due to the ambient light and due to reflected light from the pulse from the light source; in a depth frame period, outputting a pulse from the light source, and after the pulse from the light source ends, collecting a depth charge corresponding to light that is reflected from objects due to the ambient light and due to a portion of the reflected light from the pulse from the light source; and performing a depth calculation using the background charge, the reflected charge, and the depth charge, for each pixel in the CCD image sensor.

In a further embodiment, the above method is performed wherein the background charge further corresponds to a 2D color image. In another embodiment, the above method is performed wherein performing the calculation further comprises: subtracting the background charge from the depth charge, and dividing a difference obtained by a sum of: the depth charge with the background charge subtracted from it and the reflected charge with the background charge subtracted from it. In still another embodiment, performing the calculation further comprises forming a ratio of the depth charge with the background charge subtracted from it, and the reflected charge with the background charge subtracted from it. In yet another embodiment, in the method, in the background frame period, the method includes inactivating the VSUB control signal to enable a pixel to collect charge corresponding to reflected ambient light from objects in front of the lens, with no pulse from the light source. In a further method, in the reflected light frame period, inactivating the VSUB control signal, and simultaneously outputting a pulse from the light source, and collecting the reflected charge corresponding to light that is reflected from objects due to the ambient light and due to reflected light from the pulse from the light source. In still another embodiment, the above methods include in the depth frame period, outputting a pulse from the light source, and after the pulse from the light source ends, inactivating the VSUB signal to enable a pixel in the array to collect depth charge corresponding to light that is reflected from objects due to the ambient light and due to a portion of the light reflected from the pulse from the light source.

In another alternative embodiment, a method for depth imaging using a CCD image sensor includes providing an optical lens for collecting light from a scene having objects in front of the lens; providing a CCD image sensor device arranged to receive light from the optical lens and having an array of pixels and having corresponding pixel charge storage elements; providing a light source for transmitting light pulses towards the scene responsive to a pulse control signal; providing timing signals to configure the CCD image sensor to collect and store charge from pixels including a VSUB control signal that clears the pixel charge storage elements, a first readout control signal that enables a transfer cell corresponding to a pixel in a first sub-array of pixels to store charge, and a second readout control signal that enables a transfer cell corresponding to a pixel in a second sub-array of pixels to store charge; in a background frame period, collecting a background charge A corresponding to light incident on the CCD sensor that is reflected ambient light from objects in front of the lens into a transfer cell in the first sub-array, and for a portion of the background frame period, collecting a background charge B corresponding to light incident on the CCD sensor that is reflected ambient light from objects in front of the lens into a transfer cell in the second sub-array; in a depth frame period, outputting a pulse from the light source, and collecting a depth charge A corresponding to light that is reflected from objects due to the ambient light and due to a portion of the reflected light from the pulse from the light source into a transfer cell in the first sub-array, and in a portion of the depth frame period, collecting a depth charge B corresponding to light that is reflected from objects due to the ambient light and due to a portion of the reflected light from the pulse from the light source into a transfer cell in the second sub-array; and performing a depth calculation using the background charge A and the background charge B and the depth charge A and the depth charge B, for each pixel in the CCD image sensor.

A system embodiment includes an optical lens configured to collect light from a scene and directing light onto a CCD image sensor device configured to collect charge in pixel storage elements corresponding to light received on an array of pixels in the CCD image sensor, responsive to receiving timing control signals; an illumination source configured to output light pulses responsive to an output control signal, directed to illuminate objects in front of the lens; an analog to digital converter for receiving analog voltages from the CCD image sensor device and configured to perform analog to digital conversion on the analog voltages, and for outputting digital signals corresponding to the analog voltages; a timing signal generator configured to output the output control signal to the illumination source and to output timing control signals to the CCD image sensor; a processor coupled to receive the digital signals from the analog to digital converter and to execute instructions stored in a tangible medium that cause the processor to perform: receiving digital signals from the analog to digital converter that correspond to charge collected for a background frame, a reference frame, and a depth frame for pixels in the CCD image sensor; and using the received digital signals, performing a depth calculation for the pixels.

In a further embodiment, in the above system, the lens and the CCD image sensor are provided as a commercial CCD camera device. In another embodiment, in the above system, the analog to digital converter and the timing generator are provided together in an analog front end integrated circuit. In still another embodiment, in the above system, the processor is one selected from the group consisting essentially of: a microprocessor, a microcontroller, a digital signal processor, a dedicated digital media controller, a processor, an ASIC device, and an FPGA device. In yet another embodiment, in the above system the illumination source further comprises at least one LED that outputs infrared light.

Previously, use of CCD image sensors was not considered for providing depth information along with imaging for visual display, such as 2D color image information, and instead specialized depth sensors were used. In the embodiments novel solutions provide the depth information needed for 3D imaging using a conventional CCD image sensor device, while also providing the visual image information. The embodiments surprisingly overcome the problems and deficiencies of the prior art solutions, and provide novel solutions to 3D imaging at little or no additional cost over existing CCD imaging systems. The embodiments can be implemented and produced with existing CCD imaging systems, without requiring substantial modifications to the existing imaging systems.

BRIEF DESCRIPTION OF THE DRAWINGS

For a more complete understanding of the illustrative embodiments described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
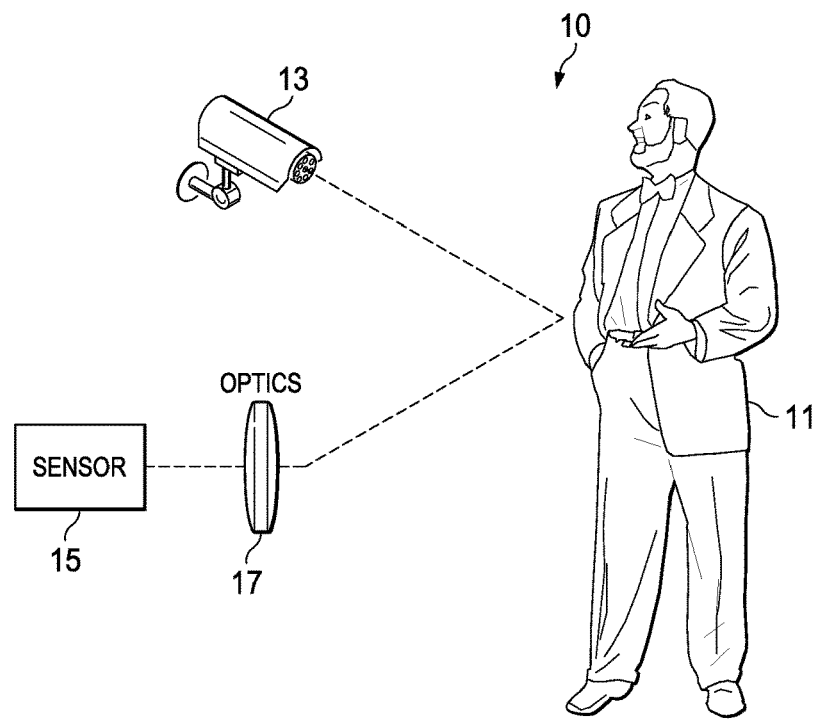
FIG. 1 illustrates a time of flight measurement made using an image sensor.

The making and using of example illustrative embodiments are discussed in detail below. It should be appreciated, however, that the embodiments provide many applicable inventive concepts that can be embodied in a wide variety of specific contexts. The specific embodiments discussed are merely illustrative of specific ways to make and use the various embodiments, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled".

In the embodiments, novel solutions are provided to providing depth information imaging and imaging in a single image sensor. The embodiments advantageously allow use of mature and conventional CCD image sensor products that are currently readily available to provide both images and to provide the depth image information required for 3D imaging. By use of novel methods, the embodiments provide CCD timing schemes and straightforward techniques which are readily implemented in software and firmware to enable the use of existing commercially available analog front end integrated circuits, and commercially available processor integrated circuits, such as digital signal processors, to rapidly implement a single sensor depth and imaging sensor including a single line imaging system, a monochrome image, a 2D imaging system or a 2D color imaging system, depending on the CCD sensor used. Because the embodiments recognize novel schemes for determining depth image information using existing hardware components, new features can readily be added to existing cameras, camcorders, and CCD sensor devices without the need for expensive modifications. Due to the use of the embodiments, imaging systems with depth and color 2D imaging can unexpectedly be produced at far lower costs than the prior known approaches.

As discussed above, TOF depth measurements are increasingly performed using phase measurements. In a phase measurement, an array of pixels in an image sensor is exposed to light reflected from objects in front of the sensor in a scene. The illumination may conveniently be chosen as coming from a pulse of infrared light, as infrared light is not visible to the human eye. The pulse of infrared light will not be visible to a person in front of the sensor, and will not introduce visible error in a still video or moving video image that is captured while the infrared illumination is present. In the phase measurement, the objects in front of the sensor (which can be, in one example embodiment, a conventional digital camera with a CCD sensor) are illuminated with the infrared light pulse from the light source and the picture elements, or pixels, in an array of pixels in the CCD image sensor are exposed to the reflected light. The reflected light includes light from the ambient scene as well as infrared light reflected off the objects after leaving the infrared illumination source. By changing the sampling time of charge storage elements associated with the pixels in the arrays, charge can be collected that is proportional to the light received on the pixels at certain time intervals, and a correspondence between the distance from the object to the sensor array and the light collected can be established. Using this information, the charge collected in the pixel storage elements can be used to determine the depth information (the distance from the sensor) of the objects in the scene.

When light is collected in the pixels and stored as charge in the storage elements, the received signals includes three unknowns:

Pixel offsets+Ambient+low frequency noise–variable 'o'–offset errors

Reflectivity of the materials×gain of the pixels–variable 'k'–gain errors

Depth information—which is a function of the distance of the object from the image sensor–variable 'd'

Because there are three unknown variables, to determine the depth information in a TOF measurement, the system must take at least three measurements with different timings. Calculations can then be made to eliminate the offset errors 'o' and the gain errors 'k' and allow accurate determination of the depth information, 'd'.

The embodiments incorporate novel methods that are applied to the timing signals for existing CCD image sensors to collect the needed information. Monochrome, color or "RGB" CCD image sensors are well known and are readily available as off the shelf devices. These mature image sensor products have long been used for digital cameras, camcorders, cell phone cameras, webcam lenses, security cameras and other image applications. The conventional CCD image sensor is built using the concept of a charge coupled device. In a CCD, a photosensitive area is provided that is coupled to a charge storage element, which is a capacitor. When the photosensitive areas are formed into picture elements, they may be referred to as pixels. A CCD image sensor array can have thousands of pixels. Both single line and 2D CCD sensors are used and are useful with the embodiments. Filters and lens elements may be formed over the pixels to create red, green and blue pixels for color. Other CCD sensors are monochrome. Each pixel has a capacitive storage element associated with it. As the photocell receives light, charge is accumulated into the associated pixel storage capacitor. After the sensing period is compete, the stored charge is transferred into transfer cells, typically additional capacitors that are not photocells, which can then be read out at a later time. A substrate voltage Vsub is applied to the pixel arrays between sample times to clear the charge from the pixel storage elements, and so ready the pixels for the next charge collection period. When the control voltage Vsub is active, the pixel storage capacitors are maintained in a cleared state.

Existing and conventional CCD devices have several commonly used timing signals that are used for the clearing, light collection and charge transfer operations. Novel features of the embodiments take advantage of controlling these existing timing signals of conventional CCD image sensors in order to make the measurements needed to determine the depth information. The novel methods use software and firmware to change the timing of the signals. The embodiments can be advantageously implemented without modifying the conventional CCD image sensors, and without modifying the commercially available hardware such as CCD image sensor control circuits that are already commercially available and that can also provide the timing signals. Commercially available processor integrated circuits, such as digital signal processors, can be used to perform the calculations of the embodiments with straightforward programming.

Figure 2:
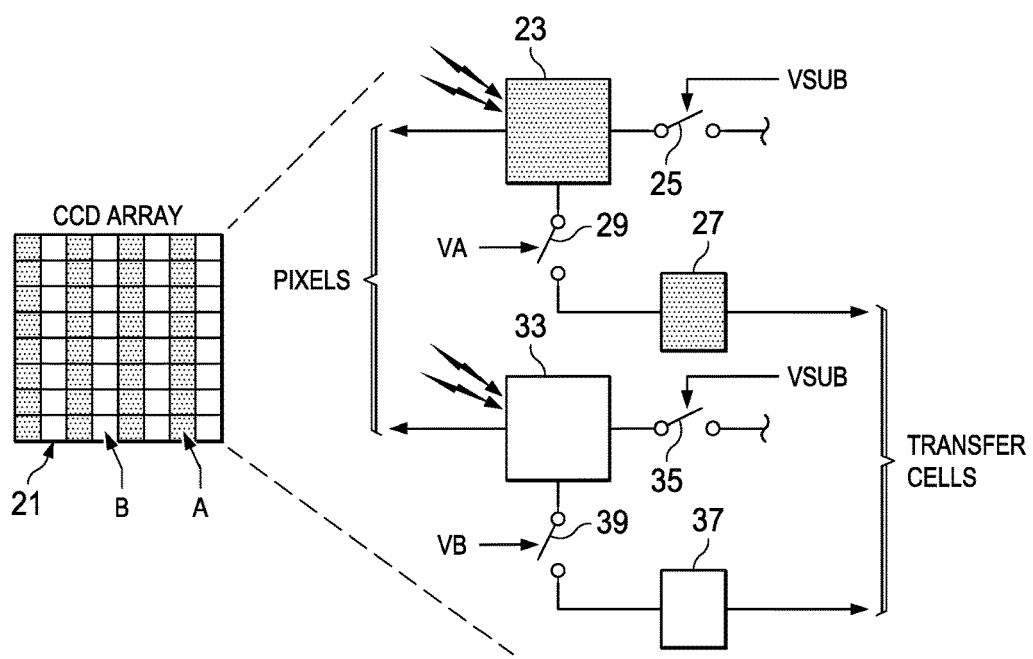
FIG. 2 illustrates in a simplified block diagram a CCD image sensor for use with the embodiments.

FIG. 2 illustrates in a simple block diagram an example CCD image sensor 20 that may be used with the embodiments. In FIG. 2, a conventional two dimensional color CCD image sensor has a pixel array 21 that includes two example pixel sub-arrays A and B. Sub-array A includes pixels 23, which are shaded dark in the figure, and sub-array B includes pixels 33, which are not shaded. A substrate clear signal VSUB is coupled to all of the pixels in each sub-array. When the switch 25 is closed, the signal VSUB is coupled to the sub-array A pixels. During the time the VSUB signal is active, the pixels are cleared, and no charge is accumulated. Similarly, when switch 35 is closed, the sub-array B pixels are cleared by the voltage on control signal VSUB. (The VSUB signal name reflects the fact that in early CCD devices this control voltage was physically coupled to the semiconductor substrate, thereby affecting all of the pixels at once.)

In FIG. 2, two sub-arrays A and B are shown as an example, and two multi-phase array control signals VA and VB shown. However in practical CCD image sensor devices there may be several readout phases of from 2 to up to 6, or more, phases. Further, although the example embodiment of FIG. 2 is illustrating a 2D CCD image sensor, a single line sensor can also be used to form additional novel embodiments. The embodiments are not limited to any particular example presented herein.

Each pixel sub-array A and B has, for each pixel, an associated charge transfer cell. For sub-array A pixels 23, the transfer cells are numbered 27. For sub-array B pixels numbered 33, the transfer cells are numbered 37.

When the switch 29 is closed by a voltage on control signal VA in FIG. 2, the charge stored for pixels 23 in sub-array A is transferred to the transfer cells 27. The sample and transfer process may be performed many, many times to provide a signal with a high signal to noise ratio ("SNR"), for example. The transfer cells will accumulate the collected charge for each of the many cycles. Once the desired charge has accumulated in the transfer cells, the transfer cells 27 can then be read out using a shifting mechanism which uses a charge coupled device transfer to shift stored charge from one storage cell to the next, for example. Once the accumulated charge is moved to the transfer cells 27, the pixels 23 in sub-array A are then available for another sampling operation (after being cleared by the SUB signal). Similarly, when the switch numbered 29 is closed due to a voltage on the control signal VB in FIG. 2, the charge accumulated in the pixels of sub-array B, 33, is transferred to the transfer cells 37, and is then available to be read out by a shifting mechanism. Again, once the transfer cells 37 receive the stored charge for the pixels 33 of sub-array B, then the pixels are available for another sampling operation.

The method embodiments disclosed herein surprisingly recognize that by simple use of the existing timing signals VSUB, VA, and VB in the example conventional color CCD image sensor of FIG. 2, the TOF phase measurement needed for depth imaging can be performed. No specialized processing or added proprietary CMOS imaging device is needed. The embodiments thus provide a system using a single CCD image sensor to output both image data such as monochrome, single line, and even color (RGB) 2D image data, and also 3D image data, without the need for specialized hardware and using simple software modifications to existing control devices. To implement the novel methods, firmware and software that control the timing signals is used, but no physical or hardware modifications are needed to realize the embodiments. An advantage that accrues from the use of the embodiments is that depth imaging features can be readily added to existing CCD image sensor systems, such as certain digital cameras, without modifying the hardware.

Figure 3A:
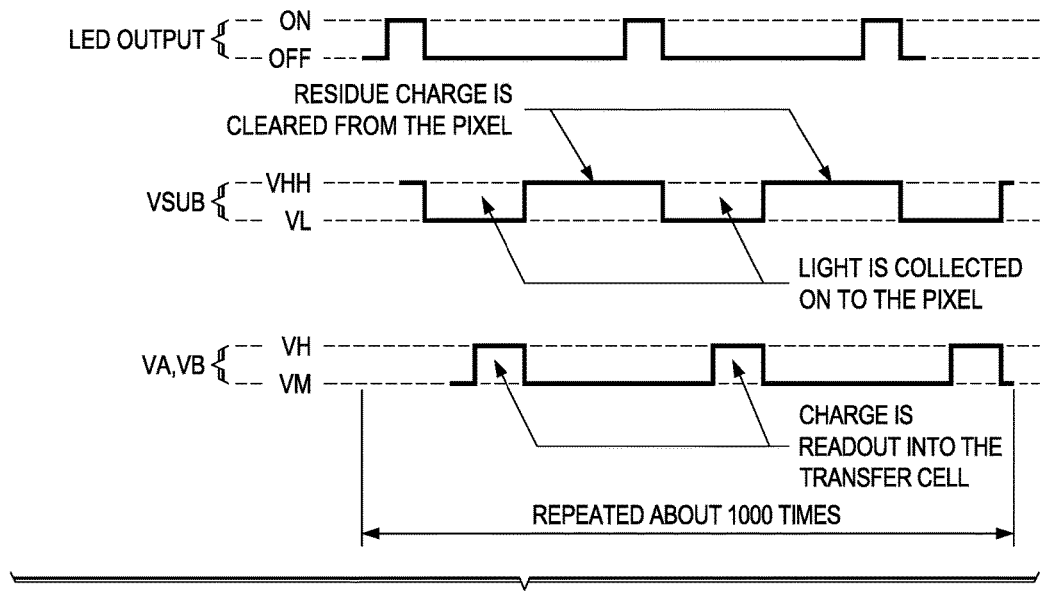
FIG. 3A illustrates in a simple timing diagram the use of a CCD image sensor to collect charge corresponding to light collected on pixels in the image sensor.
Figure 3B:
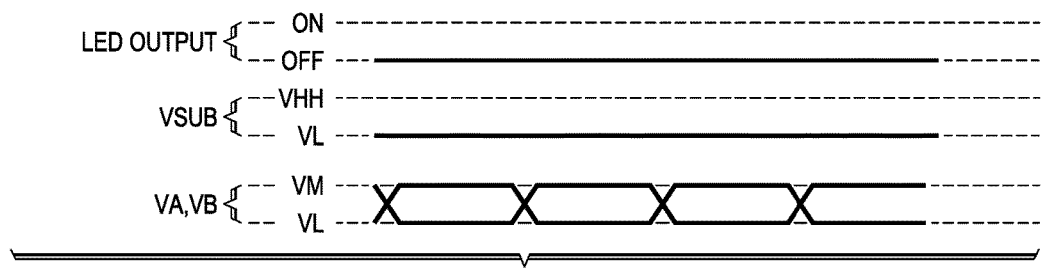
FIG. 3B illustrates in a second timing diagram the timing for reading out stored charge corresponding to sensed light collected on the pixels.

FIGS. 3A and 3B illustrate, in a simple timing diagram, certain operations used in an example method embodiment. In FIGS. 3A and 3B, the top trace, labeled "LED OUTPUT", illustrates the pulses of the LED illumination source. The second trace from the top, labeled "VSUB" indicates the timing for the VSUB signal. When the VSUB signal is high in this arrangement, the pixels are cleared. The third trace, labeled "VA, VB" combines the VA and VB control signals, and shows that for each collection of light into the pixel; the collected charge is transferred to the transfer cell prior to the clearing action by the next active VSUB signal.

In FIG. 3A, an integration operation is illustrated. During integration, the light source is pulsed on at regular intervals, as shown in the top trace. The light pulse may be on the order of a few nanoseconds in duration, for example, but is not so limited. The light source may be, for example, an infrared LED or an array of infrared LEDs. In some applications, where human observers might see the light pulses, infrared light is particularly desirable for the pulses as it is not visible to the human observers, but it is collected by the pixels. In other applications, lasers could be used. In a different context, LEDs or other sources of visible light such as red or green light could be used. Following or during a portion of a pulse of the light source, the VSUB signal is lowered. When signal VSUB is high, the pixels are cleared. When the VSUB signal falls, the light falling on the photosensitive pixel area results in a corresponding charge that is stored in the pixel memory element. The transfer control voltages VA and VB are raised during the integration period and the charge collected in the pixel memory element is thus transferred to the corresponding transfer cell. As indicated in FIG. 3A, this process is repeated hundreds or thousands of times. By taking numerous samples, the signal to noise ratio of the system is increased, and the collected charge is known not to be sensitive to noise or other errors that might occur.

In an embodiment method, the VSUB signal is modulated to gate the collection of light in the pixels (resulting in charge collected in the pixel memory element) to perform a correlation between the received light and the gating. As the received light pulse has a delay time that is proportional to the distance from the light emitter to the objects in front of the sensor (depth information), the correlation obtained is different for different distances.

FIG. 3B then illustrates the transfer operation. In FIG. 3B, VSUB is low and the LED output is off, that is no light source pulses are active. The readout control signals VA, VB are used to cause the charge accumulated in the transfer cells to be shifted to the output of the CCD image sensor. In a typical sensor, the shift transfer is performed first row-wise, and then column wise, and analog voltage signals corresponding to the collected charges are then output.

In a system using a conventional CCD image sensor, such as one used with the embodiments, an analog to digital converter (ADC) which can be external to the CCD image sensor, or may be integrated with it, receives the analog voltage signals from the CCD image sensor and outputs digital signals corresponding to the collected charge. The digital signals from the ADC are then coupled to a digital signal processor (DSP) or another processor or a microprocessor for processing.

In this example embodiment method, which uses VSUB modulation to determine the depth information, the DSP will execute a program to collect digital data corresponding to three consecutive image frames, each having slightly different timing, and then perform a calculation method to determine the depth (distance) and ambient levels (visual image) for each pixel. Depending on the CCD sensor used, the visual image may be monochrome or color (RGB).The timing and calculations are further described below. The depth information may then be output by the DSP for use in an image display, for example. In another alternative method embodiment described below, both the VA and VB signals are modulated, and that alternative method uses a different calculation to determine the depth information by comparing the information from two adjacent pixels, using two collected frames for each pixel.

Figure 4A:
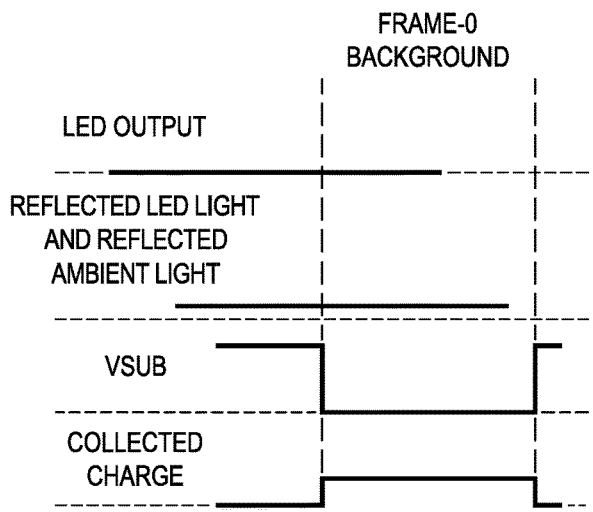
FIG. 4A illustrates in a simple timing diagram a first image frame collection of an example embodiment.
Figure 4B:
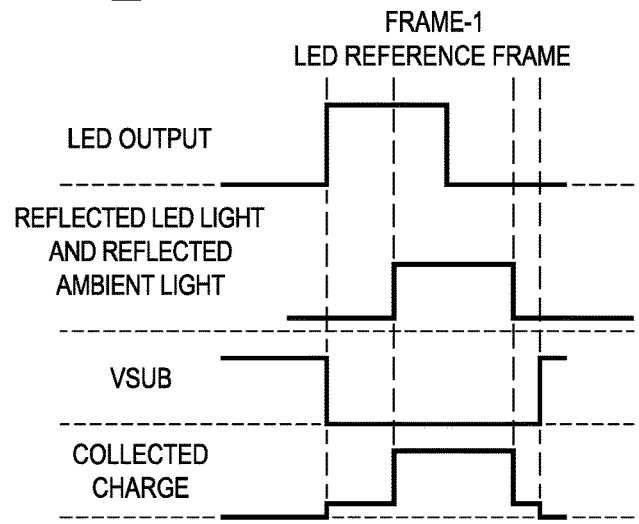
FIG. 4B illustrates in another simple timing diagram a second image frame collection of the example embodiment of FIG. 4A.
Figure 4C:
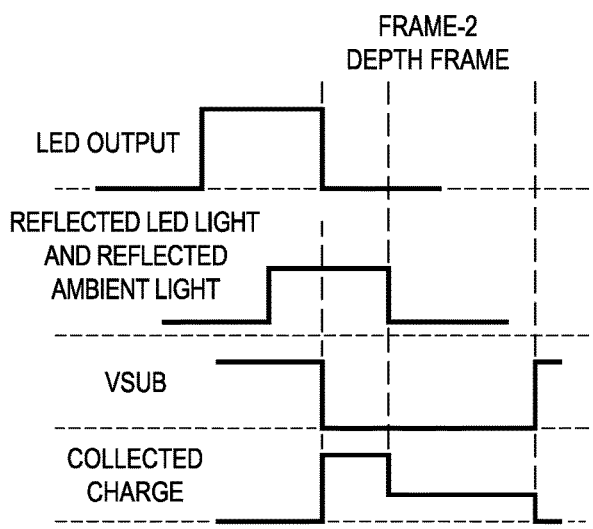
FIG. 4C illustrates in a timing diagram a third image frame collection of the example embodiment of FIGS. 4A and 4B.

FIGS. 4A-4C illustrate the collection of three image frames needed to perform the calculation of this example method embodiment. In this example method embodiment, the VSUB signal is modulated to make the phase measurement (which provides the depth information).

In the timing diagram of FIGS. 4A-C, the top trace, labeled "LED OUTPUT" corresponds to the output pulses of the illumination source. The second trace from the top, labeled "REFLECTED LED LIGHT AND REFLECTED AMBIENT LIGHT", corresponds to light incident on a pixel in the CCD image sensor, which is a combination of reflected LED light, and reflected ambient light, both coming from objects in front of the sensor. The third trace down from the top of the figure, labeled simply "VSUB", and illustrates the timing for the VSUB control signal. The bottom trace, labeled "COLLECTED CHARGE", illustrates the collected charge for a pixel storage element.

In FIG. 4A, the timing diagram illustrates the collection of FRAME-0, the background level frame. In FRAME-0, no illumination is output by the LED source. At the beginning of the timing diagram, VSUB falls from a high level to allow the pixels to sense incident light, and the pixel storage elements begin collecting charge. Since the only light incident on the sensor in this FRAME-0 is the ambient light reflected by the objects in the scene, this frame collects charge corresponding to the background, that is, the ambient light that is reflected to the sensor by the objects in the scene. In an advantageous benefit of the embodiment methods, the background image collected in FRAME-0 is also the ambient image of the scene. So in performing the method, the image data, such as for example a 2D color image, is collected and that is available to the system.

In FIG. 4B, a timing diagram illustrates the collection of FRAME-1, the LED Reference Frame. As shown in FIG. 4B, at the beginning of the timing diagram, the LED source outputs a pulse, at the same time or about the same time, VSUB falls to a low level. Thus the pixel storage elements begin accumulating charge. After a delay time corresponding to a time of flight delay, reflected LED light from the object also begins to arrive on the pixels, and the collected charge increases. This is shown in FIG. 4B by a rising edge in the trace labeled "REFLECTED LED LIGHT AND REFLECTED AMBIENT LIGHT" and a corresponding rising edge in the trace labeled "COLLECTED CHARGE". In the Frame-1 collection, the VSUB signal is low for a time that is extended long enough to collect all of the reflected light. That is, the charge collection continues after the reflected LED light ends, as seen by a falling edge at the right side of FIG. 4B in both the trace labeled "REFLECTED LED LIGHT AND REFLECTED AMBIENT LIGHT" and the trace labeled "COLLECTED CHARGE". Thus in Frame-1 all of the reflected light is collected.

FIG. 4C illustrates the timing for FRAME-2, the depth frame. In FIG. 4C, in the timing diagram an LED output pulse happens first. The LED output pulse is completed before the VSUB signal falls. Thus, for this depth frame, only a portion of the reflected LED light will be sensed by the pixels and the corresponding charge collected. This can be seen in that the trace labeled "REFLECTED LED LIGHT AND REFLECTED AMBIENT LIGHT" is already at a high level when VSUB falls, because the reflected light from the LED pulse is already coming back to the sensor. The collected charge, shown in the bottom trace, has a high level for the first part of the sampling period controlled by VSUB, but then falls after the reflected LED light stops arriving. The depth information corresponds to the time delay from the time the LED pulse ends, and the time the reflected light ends, but because other variables also affect the depth frame, the actual distance (or delay time) must be calculated.

The calculations needed to determine the depth information (or the phase measurement) are straightforward and are easily performed by commonly available programmable processors, for example. The calculations that are performed on each the collected charge for each pixel in the CCD image sensor are:

Charge collected during FRAME-0 in FIG. 4A:
Cb—background charge

Charge collected during FRAME-1 in FIG. 4B: Cr—reflected charge

Charge collected during FRAME-2 in FIG. 4C:
Cd—depth charge

To calculate depth information (or to calculate phase measurement):

Depth=$(Cd-Cb)/((Cd-Cb)+(Cr-Cb))$.    (Equation 1).

An alternate, simpler form can be used, which is simply the ratio:

Depth=$(Cd-Cb)/(Cr-Cb)$.    (Equation 2).

These calculations are performed for each pixel location in the CCD image sensor to form the depth information for the array of pixels.

The method embodiment above provides the depth information by modulating the timing of the VSUB signal relative to the pulses from the illumination source. In a system that incorporates an existing CCD camera, using the method of this embodiment requires only adding a controllable light source, such as an LED infrared source, to the camera facing into the scene, and providing the timing signals to the LED source and the VSUB signal as shown. The collection of the charge for each of the three frames, and the calculations needed to determine the depth information for each pixel, are straightforward operations that the conventional CCD camera system can perform without any further hardware modifications. The timing generation can be performed by an existing analog front end integrated circuit, for example, that is programmable, and the calculations are performed by a known processor, such as a digital signal processor, which is likewise programmable. Thus by providing appropriate software instructions, existing off the shelf components can be used to readily implement the method embodiment as described above.

In this method, the charge collected in FRAME-0 of FIG. 4A is the background image, that is, for a color (RGB) CCD image sensor, it is simply the 2D image. For a monochrome image sensor, it is a gray scaled 2D image, and single line CCD image sensors may also be used. Thus when using the embodiments, both depth image information and the ambient image are obtained using a single sensor with a single optics system. The embodiment methods are in sharp contrast to the known prior solutions, which require a dedicated depth sensor and a separate image sensor to collect the visual image. In an example embodiment the visual image is a color 2D image, as a color 2D CCD image sensor was used.

In an alternative method embodiment, the depth information is obtained by modulating the two readout signals such as VA and VB in FIGS. 3A and 3B above. Because both control signals VA and VB are modulated, the depth information can be obtained in this method embodiment using only 2 collected image frames. By modulation of both control signals, the depth can be determined from only collecting a background frame and a depth frame. The control signals are used to control the timing of charge collection in pixels A and B which are neighbors, or adjacent pixels, that are exposed to similar reflected and ambient light coming to the sensor from the scene.

Figure 5A:
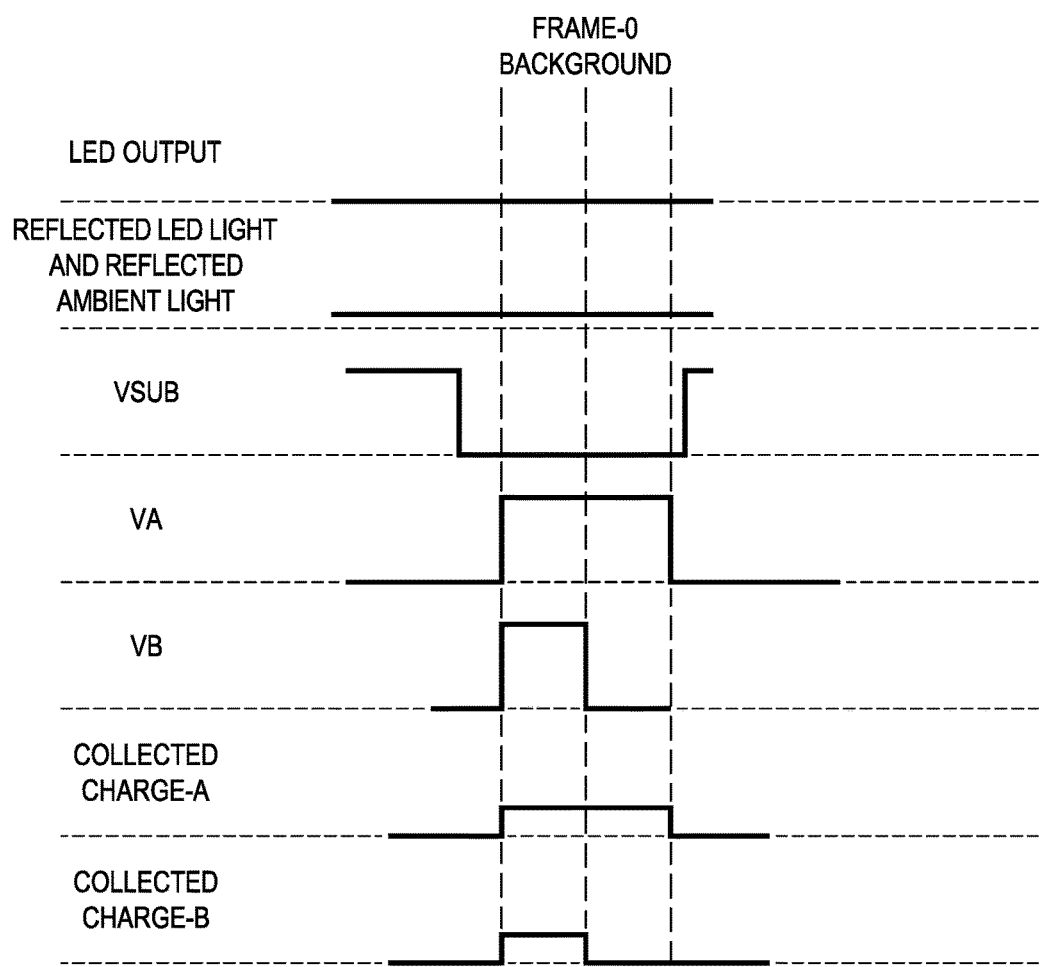
FIG. 5A illustrates in a simplified timing diagram a first image frame collection of another example embodiment.

In FIG. 5A, a timing diagram illustrates the timing of the FRAME-0 collection for this alternative method embodiment. The top trace in FIGS. 5A and 5B, labeled "LED OUTPUT" illustrate the timing of the LED output pulses. The second trace from the top labeled "REFLECTED LED LIGHT AND REFLECTED AMBIENT LIGHT", illustrates the light received at the pixel. This is light received due to the ambient scene lighting and the light reflected from objects illuminated by the LED output pulse. The third trace from the top of FIGS. 5A and 5B, simply labeled "VSUB", illustrates the timing of the VSUB signal. The fourth trace of the top labeled "VA" illustrates the timing of the VA voltage control signal. The fifth trace from the top, labeled "VB", illustrates the timing of the VB voltage control signal. The sixth trace from the top, labeled "COLLECTED CHARGE A", illustrates the charge collected by a pixel in the A sub-array. The bottom trace, labeled "COLLECTED CHARGE B", illustrates the charge collected by a pixel in the B sub-array.

In FIG. 5A, the timing of the FRAME-0 collection is shown, the background frame. As shown by the top trace in the timing diagram, no pulse is output by the LED. The only light received at the pixel is therefore reflected ambient light, as shown by the second trace. At the beginning of the sampling period, the voltage VSUB falls, allowing the pixel storage elements to collect charge. The VA control signal is active throughout the collection period, so that all of the available light is collected in a pixel in the A sub-array. This is shown in the trace labeled COLLECTED CHARGE A, which rises to a steady level and remains at that level throughout the sampling period. The control voltage VB is only active in the first half of the collection period of FRAME-0. This is reflected in the trace labeled COLLECTED CHARGE B, which illustrates charge being collected only in the first half of the collection period.

Figure 5B:
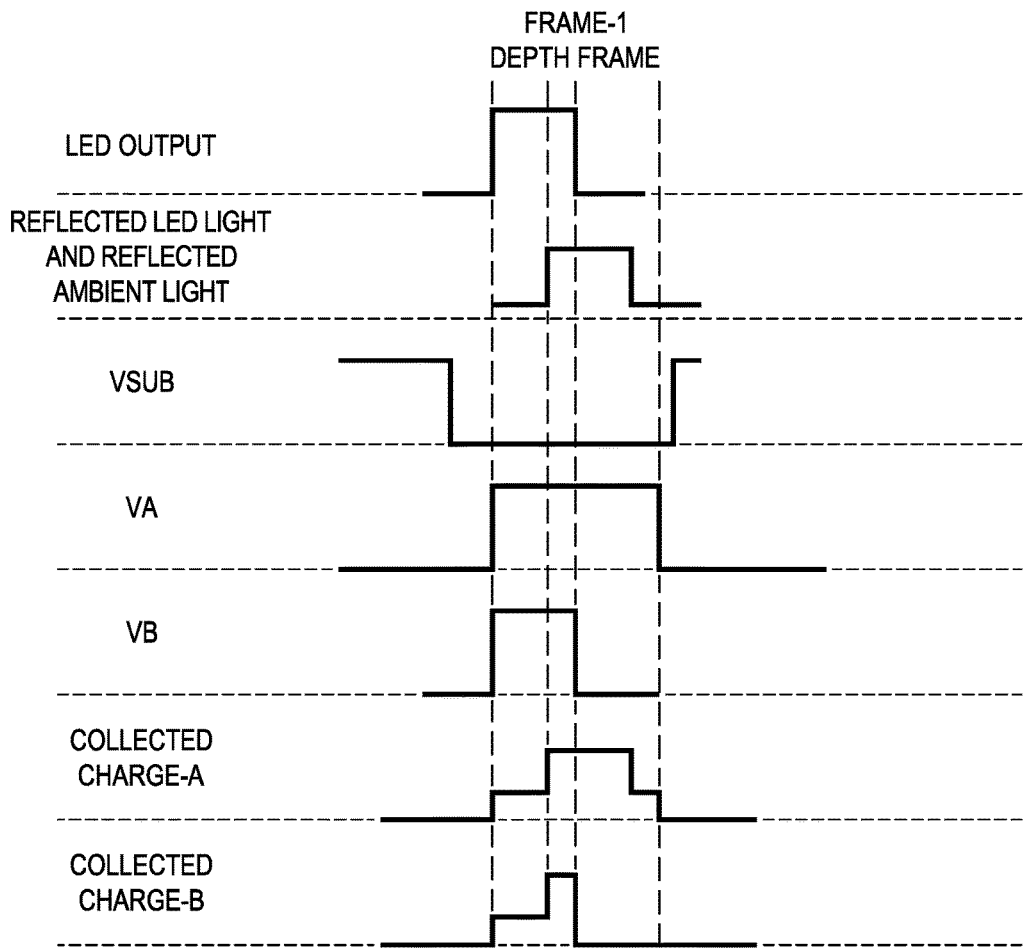
FIG. 5B illustrates in another simplified timing diagram a second image frame collection of the example embodiment of FIG. 5A.

FIG. 5B illustrates the timing of the FRAME-1, the depth frame collection, with the traces labeled the same as in FIG. 5A as discussed above. As shown in the timing diagram, the VSUB signal again falls low to begin the sampling process. The LED output is pulsed in FRAME-1 as shown in the top trace. During the LED pulse, the light reflected from the objects in front of the sensor begins arriving at the pixels, as seen in the trace labeled REFLECTED LED LIGHT AND REFLECTED AMBIENT LIGHT, the reflected light begins arriving about halfway through the FRAME-1 period. As it was for the timing diagram in FRAME-0, the VA signal is high throughout the collection, so that an A pixel will collect all of the light, including both the ambient background light reflected and also the reflected LED light. This is shown in the trace labeled COLLECTED CHARGE A where the trace begins at a low level after VA goes high, then the collected charge increases to a higher level while the reflected LED light is arriving, and then the collected charge falls again when the reflected LED light stops arriving near the end of the timing diagram. The control signal VB is active only for the time that the LED output pulse is active. The B pixel then collects charge only during the time the LED output is active, which includes only a portion of the reflected LED light. This can be seen by the bottom trace labeled COLLECTED CHARGE B, which starts at a low level when the VB signal goes high, and then increases when the reflected LED light begins arriving. The trace labeled COLLECTED CHARGE B falls when the VB signal falls, halfway through the collection period of FRAME-1.

To determine the depth information, the following calculations are made:

Charge that is collected in pixel A during FRAME-0=Cab—charge A background

Charge that is collected in pixel B during FRAME-1=Cbb—charge B background

Charge that is collected in pixel A during FRAME-1=Cad—charge A depth

Charge that is collected in pixel B during FRAME-1=Cbd—charge B depth

The calculation for depth information may then be given by:

Depth information=$(Cbd-Cbb)/((Cad-Cab)+(Cbd-Cbb))$ (Equation 3)

In another simpler form, which forms an alternative calculation that can be used in the embodiment method, the Depth information is simply the ratio $(Cbd-Cbb)/(Cad-Cab)$ (Equation 4)

In this alternative method embodiment, the ambient information, that is the visual image, is simply Cab and Cbb for the pixels A and B. Thus the alternative method embodiment provides both the depth information needed for a 3D image, and the visual image information, using a single conventional CCD image sensor, and a single optics system. In contrast to the method embodiment using the VSUB modulation described above, this method embodiment requires only 2 collected frames, as two variables (control signals VA and VB) are modulated in each collection frame.

Figure 6:
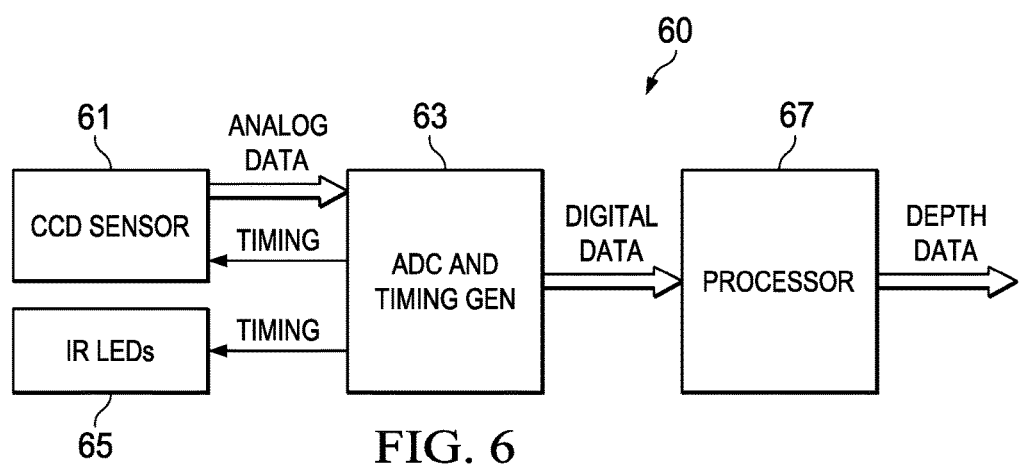
FIG. 6 illustrates in a simple block diagram a system for use with the embodiments.

FIG. 6 illustrates in a simple block diagram a system 60 for use with the embodiments. In FIG. 6, CCD sensor 61 is a conventional CCD image sensor device. The CCD sensor output is analog data that corresponds to the charge collected and transferred from the array of pixels as described above. An analog front end device 63 provides analog to digital conversion and also provides the timing signals needed such as VSUB, VA, VB as shown in the figures above. The analog front end may conveniently be a commercial off the shelf CCD image sensor control device such as a VSP6300A integrated circuit provided by Texas Instruments, Incorporated. This device includes an analog to digital converter function and also outputs the timing signals intended for use in controlling a CCD image sensor. Other similar devices including a standalone ADC in combination with a controller device or a microprocessor could be used in the system to generate the timing signals may also be used to implement the analog front end 63. The infrared LEDs 65 are provided at or near the sensor device and are also controlled by timing signals from the analog front end 63. The analog to digital converter circuitry in the analog front end 63 outputs digital data to a processor 67. This processor may conveniently be implemented using an existing digital signal processor, such as, for a non-limiting example, a TMS320DM365 DSP device supplied by Texas Instruments, Incorporated. However, the embodiments are not limited to a specific processor and many other digital signal processors may be used. In alternative embodiments, any programmable microprocessor, processor, microcontroller, or a similar function formed as an FPGA or ASIC integrated circuit may be used for processor 67. The processor 67 executes instructions stored in the processor, or stored in another tangible medium such as non-volatile memory. When executing the instructions, the processor 67 performs the calculations described above to determine the depth information, and can output the resulting results data corresponding to the depth information for further processing. For example, the depth data may be used in forming a 3D image that may be displayed for visual inspection.

Figure 7A:
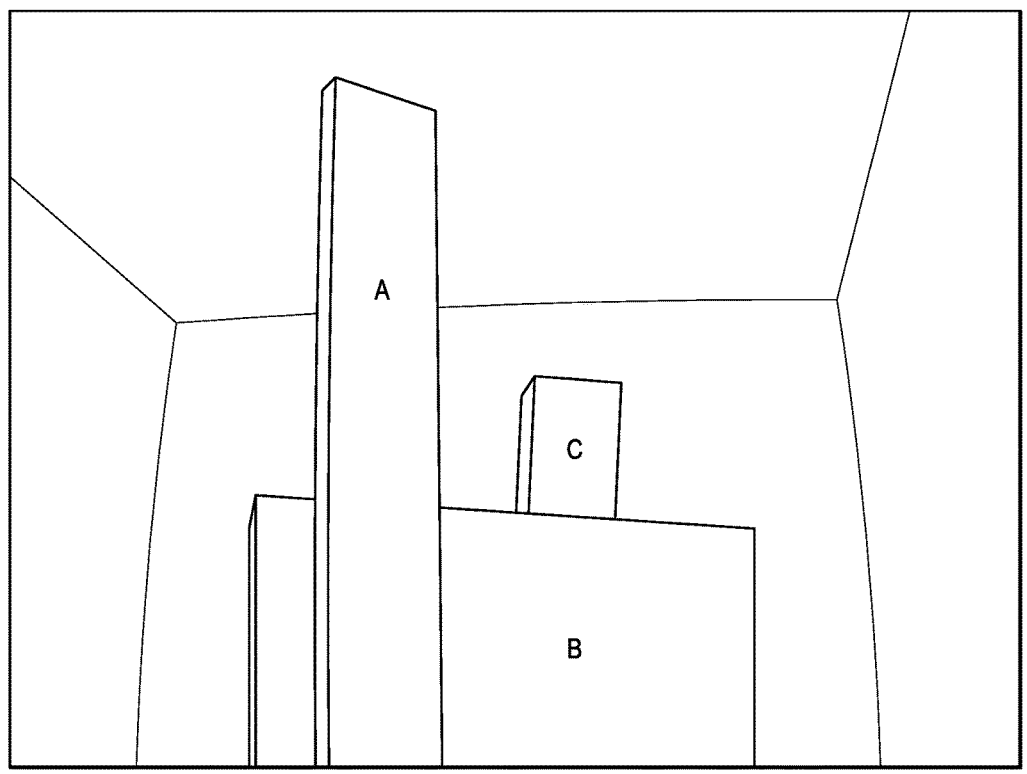
FIG. 7A illustrates a scene that includes objects placed at various distances from a sensor of the embodiments.

FIG. 7A is an example 2D image of a scene used to illustrate the operation of an illustrative example system performing the embodiments. In FIG. 7, a 2D image is shown for a scene with three objects labeled A, B and C positioned in front of a camera including a conventional CCD image sensor. (Note: the original image was an RGB color image but the image was redrawn in black and white for the purpose of this patent application). The object A is positioned closer to the sensor, with objects B and C positioned farther from the sensor.

Figure 7B:
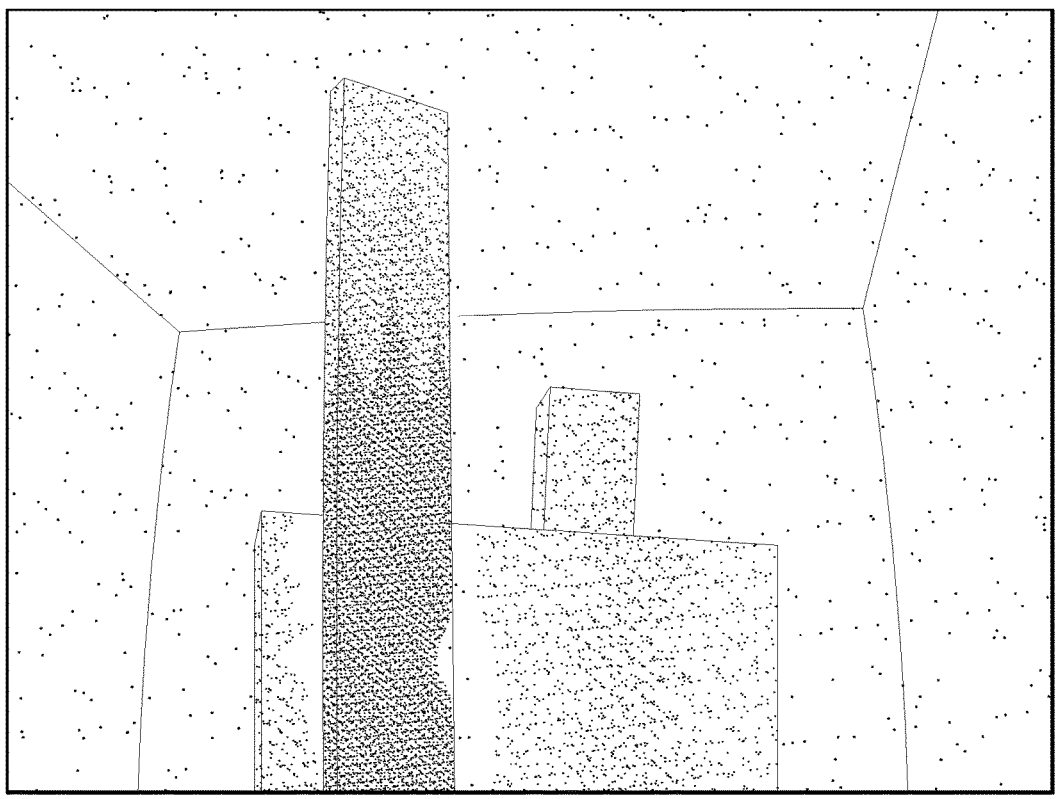
FIG. 7B illustrates a visual representation of the depth image obtained for the scene in FIG. 7A produced using one of the embodiment methods.

FIG. 7B is an image that is a visual display of the depth information obtained using the embodiment methods for the scene shown in FIG. 7A. In FIG. 7B, the depth information is represented by the shading. The objects closest to the sensor are displayed as darkly shaded, and for the objects are farther from the sensor, the shading is lighter (Note: this image was originally an RGB color image, with red being used for objects closest to the sensor, and blue being used for objects farther from the sensor, but the color image has been redrawn in black and white shading for purposes of illustration for this patent application.) The depth image information was produced using a conventional CCD image sensor with the analog front end and digital signal processor devices supplied by Texas Instruments, Incorporated, such as described for FIG. 6, above.

Figure 8:
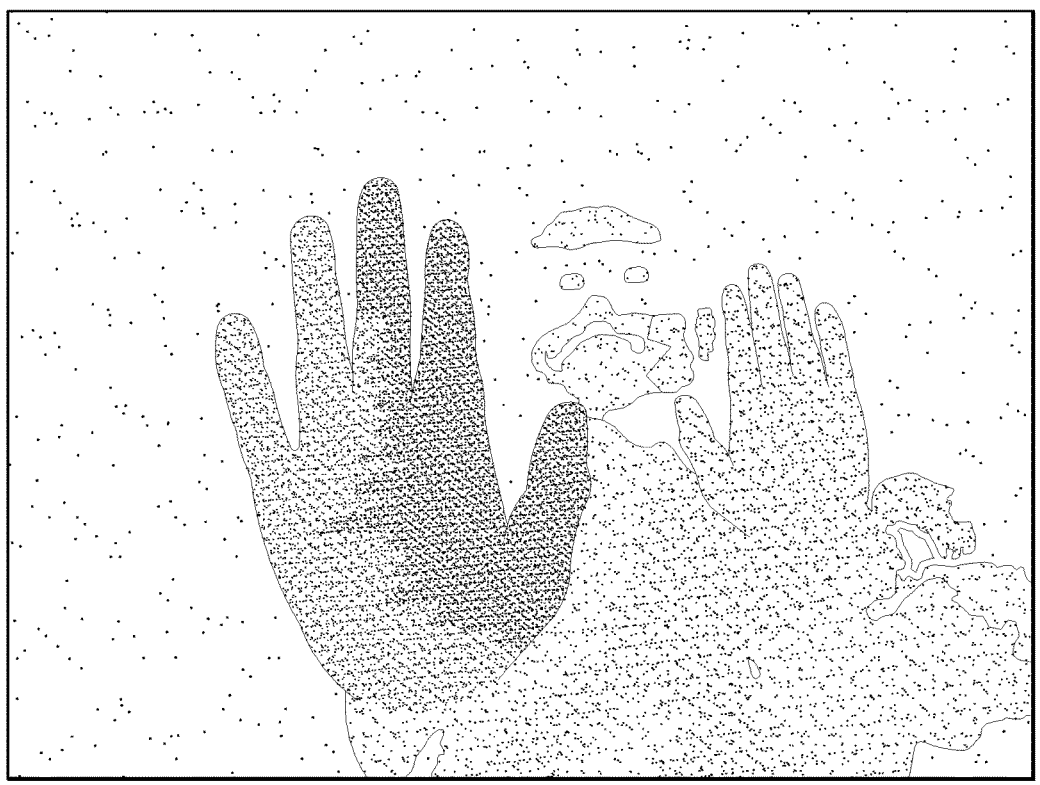
FIG. 8 illustrates a visual representation of a depth image obtained using the embodiment methods for a scene including a person standing in front of an image sensor.

FIG. 8 illustrates another example depth image provided using the embodiments. Again the system used a conventional CCD image sensor and lens, with the analog front end integrated circuit and the digital signal processor as described above with respect to FIG. 6. In FIG. 8 the depth information determined for a scene when a person is gesturing towards the CCD image sensor is displayed. Again the dark shaded areas are closest to the sensor, and the lighter shaded areas are farther away. (Note: this image was originally a color RGB image where red represented portions of the scene that were closest to the sensor, and blue was used for objects farthest from the sensor. The color image has been redrawn in black and white for the purpose of this patent application, using shading.)

The method embodiments described above further enable real time depth information to be produced simultaneously with single line, 2D, monochrome or 2D color video images, so that 3D video can be produced. Alternatively still images can be produced including both the depth information and the visual images. The embodiments may be used in a wide variety of applications, including 3D video and 3D still image capture, game systems, gesture recognition, security cameras, autofocusing systems, metering or distance measurement applications and other machine vision applications where depth information is needed.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A method for depth imaging using a CCD image sensor, comprising:
providing an optical lens for collecting light from a scene having objects in front of the lens;
providing a CCD image sensor device arranged to receive light from the optical lens and having an array of pixels and having corresponding pixel charge storage elements;
providing a light source for transmitting light pulses towards the scene responsive to a pulse control signal;
providing timing signals to configure the CCD image sensor to collect and store charge from pixels including a VSUB control signal that clears the pixel charge storage elements, a first readout control signal that enables a transfer cell corresponding to a pixel in a first sub-array of pixels to store charge, and a second readout control signal that enables a transfer cell corresponding to a pixel in a second sub-array of pixels to store charge;
in a background frame period, collecting a background charge A corresponding to light incident on the CCD sensor that is reflected ambient light from objects in front of the lens into a transfer cell in the first sub-array, and for a portion of the background frame period, collecting a background charge B corresponding to light incident on the CCD sensor that is reflected ambient light from objects in front of the lens into a transfer cell in the second sub-array;
in a depth frame period, outputting a pulse from the light source, and collecting a depth charge A corresponding to light that is reflected from objects due to the ambient light and due to a portion of the reflected light from the pulse from the light source into a transfer cell in the first sub-array, and in a portion of the depth frame period, collecting a depth charge B corresponding to light that is reflected from objects due to the ambient light and due to a portion of the reflected light from the pulse from the light source into a transfer cell in the second sub-array; and
performing a depth calculation using the background charge A and the background charge B and the depth charge A and the depth charge B, for each pixel in the array of pixels in the CCD image sensor.

2. The method of claim 1, and further comprising, in the background frame period:
configuring the VSUB control signal to enable pixels to collect charge;
during an entire background frame period, activating the first readout control signal to enable the collection of background charge A into the transfer cell in the first sub-array; and
during a portion of the background frame period, activating the second readout control signal to enable the collection of background charge B into the transfer cell in the second sub-array.

3. The method of claim 1, and further comprising, in the depth frame period:
configuring the VSUB control signal to enable pixels to collect charge;
during a portion of the depth frame period, activating the pulse control signal to cause a light pulse from the light source;
during an entire depth frame period, activating the first readout control signal to enable the collection of depth charge A into the transfer cell in the first sub-array; and
during a portion of the depth period that corresponds to the light pulse, activating the second readout control signal to enable the collection of depth charge B into the transfer cell in the second sub-array.

4. The method of claim 1, wherein performing the calculation further comprises:
subtracting the background charge B from the depth charge B, and dividing a difference obtained by a sum of: the depth charge B with the background charge B subtracted from it, and the depth charge A with the background charge A subtracted from it.

5. The method of claim 1, wherein collecting background charge A comprises collecting charge corresponding to a 2D color image of the objects.

* * * * *